(12) United States Patent
Hoecker (10) Patent No.: US 7,878,073 B2
(45) Date of Patent: *Feb. 1, 2011

(54) MEASURING SYSTEM WITH A FLOW CONDITIONER ARRANGED AT AN INLET OF A MEASURING TABLE

(75) Inventor: Rainer Hoecker, Waldshut-Tiengen (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/585,772

(22) Filed: Sep. 24, 2009

(65) Prior Publication Data

US 2010/0043566 A1   Feb. 25, 2010

Related U.S. Application Data

(62) Division of application No. 11/826,993, filed on Jul. 19, 2007, now Pat. No. 7,600,436.

(60) Provisional application No. 60/832,592, filed on Jul. 24, 2006, provisional application No. 60/849,769, filed on Oct. 6, 2006.

(51) Int. Cl.
*G01F 1/32* (2006.01)

(52) U.S. Cl. .................................. 73/861.22; 73/861.64

(58) Field of Classification Search ........................ None
See application file for complete search history.

(56) References Cited

U.S. PATENT DOCUMENTS 2,704,555 A   3/1955   Dall (Continued)

FOREIGN PATENT DOCUMENTS

DE   40 13 351 A1   10/1990

(Continued)

*Primary Examiner*—Harshad Patel
(74) *Attorney, Agent, or Firm*—Bacon & Thomas, PLLC (57) ABSTRACT

The measuring system is inserted into the course of a process line and serves for registering at least one measured variable of a medium flowing in the process line. The measuring system includes for such purpose a measuring transducer having a measuring tube serving for conveying medium being measured and a sensor arrangement, which has at least one sensor element reacting primarily to the measured variable to be registered, and which delivers by means of at least one sensor element at least one measurement signal influenced by the measured variable. Further, the measuring system includes a measuring electronics communicating with the measuring transducer and using the at least one measurement signal for producing, at least at times, at least one measured value instantaneously representing the measured variable. The measuring tube has, in the case of the measuring system of the invention, a smaller flow cross section than a supply segment of the process line connected to the inlet end of the measuring system. To this end, the measuring system further includes a flow conditioner arranged at the inlet end of the measuring tube and mediating between the measuring tube and the supply segment of the process line. The flow conditioner has a lumen tapering in the direction of the measuring tube. During operation, medium flows through the lumen of the flow conditioner. The flow conditioner includes at least one impingement surface arranged upstream of its outlet end and protruding into the lumen of the flow conditioner. During operation, medium conveyed in the flow conditioner flows against the impingement surface.

11 Claims, 6 Drawing Sheets

U.S. PATENT DOCUMENTS

| | | |
|---|---|---|
| 2,995,933 A | 8/1961 | Patton |
| 3,433,069 A | 3/1969 | Trageser |
| 3,686,946 A * | 8/1972 | Halmi .................... 73/861.64 |
| 3,736,797 A | 6/1973 | Brown |
| 3,894,562 A | 7/1975 | Moseley |
| 4,015,472 A | 4/1977 | Herzl |
| 4,363,238 A | 12/1982 | Willam |
| 4,453,416 A | 6/1984 | Knudsen |
| 4,516,434 A * | 5/1985 | Halmi .................... 73/861.64 |
| 4,528,847 A | 7/1985 | Halmi |
| 4,592,240 A | 6/1986 | McHale |
| 4,977,781 A | 12/1990 | Misumi |
| 4,984,470 A | 1/1991 | Hayward |
| 5,123,285 A | 6/1992 | Lew |
| 5,127,173 A | 7/1992 | Thurston |
| 5,170,671 A | 12/1992 | Miau |
| 5,326,468 A | 7/1994 | Cox |
| 5,396,808 A | 3/1995 | Huang |
| 5,533,549 A | 7/1996 | Sherman |
| 5,596,969 A | 1/1997 | Lipinski |
| 5,808,209 A | 9/1998 | Zielinska et al. |
| 6,058,787 A | 5/2000 | Hughes |
| 6,095,196 A | 8/2000 | McCarty |
| RE37,617 E | 4/2002 | Sherman |
| 6,612,187 B1 | 9/2003 | Lund |
| 6,886,413 B1 | 5/2005 | Chang |
| 6,898,986 B2 | 5/2005 | Daniel |
| 7,082,840 B2 | 8/2006 | Bengston |
| 2002/0043103 A1 | 4/2002 | Uramachi |
| 2002/0178837 A1 | 12/2002 | Brandt |
| 2003/0141480 A1 | 7/2003 | Green |
| 2004/0173030 A1 | 9/2004 | Harman |
| 2005/0092101 A1 | 5/2005 | Bengtson |

FOREIGN PATENT DOCUMENTS

| | | |
|---|---|---|
| DE | 44 41 874 A1 | 5/1996 |
| DE | 197 29 563 A1 | 1/1999 |
| DE | 197 42 295 A1 | 4/1999 |
| DE | 198 52 015 A1 | 12/1999 |
| DE | 198 45 898 A1 | 4/2000 |
| DE | 199 57 437 A1 | 7/2000 |
| DE | 103 27 934 B3 | 2/2005 |
| GB | 2 084 324 A | 4/1982 |
| GB | 2 142 725 A | 1/1985 |
| GB | 88 14 611.1 | 2/1989 |
| GB | 2 342 167 A | 4/2000 |
| GB | 2 402 971 A | 12/2004 |
| WO | WO 95/19504 | 7/1995 |

* cited by examiner

MEASURING SYSTEM WITH A FLOW CONDITIONER ARRANGED AT AN INLET OF A MEASURING TABLE

CROSS-REFERENCES

This application is a divisional of U.S. patent application Ser. No. 11/826,993, which was filed on Jul. 19, 2007, as a nonprovisional of U.S. Provisional Application 60/832,592 filed on Jul. 24, 2006 and U.S. Provisional Application 60/849,769 filed on Oct. 6, 2006 and which claims the benefit of German application numbers 102006034296.8 filed on Jul. 21, 2006 and 102006047815.0 filed on Oct. 6, 2006. It also contains subject matter which is related to the subject matter disclosed in U.S. patent application Ser. No. 11/826,992 filed on Jul. 19, 2007.

FIELD OF THE INVENTION

The invention relates to a measuring system for measuring with a measuring transducer at least one measured variable, especially a mass flow, e.g. mass flow rate, density, viscosity, pressure, or the like, of a medium flowing in a process line, as well as to a flow conditioner mediating between the measuring transducer and the process line.

BACKGROUND OF THE INVENTION

In the field of industrial process measurements technology, especially also in connection with the automation of chemical or manufacturing processes, for registering process-describing, measured variables, and for producing measurement signals representing these, measuring systems installed near the process are used. Such measuring systems are mounted either directly on, or in, a process line, for instance a pipeline, through which medium is flowing. The variables to be measured can include, for example, mass flow, volume flow, flow velocity, density, viscosity, temperature, or the like, of a liquid, powdered, vaporous, or gaseous, process medium conveyed or held in such a process line.

Such measuring systems include, among others, those in which in-line measuring devices with magneto-inductive transducers are used, or transducers which evaluate the travel time of ultrasonic waves emitted in the flow direction, especially measuring transducers functioning according to the Doppler principle, or vibration-type transducers, especially Coriolis mass flow transducers, density transducers, or the like. Essentials of construction and functioning of magneto-inductive sensors is sufficiently described e.g. in EP-A 1 039 269, U.S. Pat. Nos. 6,031,740, 5,540,103, 5,351,554, 4,563,904; for ultrasonic sensors see e.g. U.S. Pat. Nos. 6,397,683, 6,330,831, 6,293,156, 6,189,389, 5,531,124, 5,463,905, 5,131,279, 4,787,252. Moreover, this background on these topics is adequately known to those skilled in the art, so that a detailed explanation can be omitted here. Further examples of such measuring systems known per se to those skilled in the art, especially systems made up of compact, in-line measuring devices, are explained in detail in EP-A 984 248, GB-A 21 42 725, U.S. Pat. Nos. 4,308,754, 4,420,983, 4,468,971, 4,524,610, 4,716,770, 4,768,384, 5,052,229, 5,052,230, 5,131,279, 5,231,884, 5,359,881, 5,458,005, 5,469,748, 5,687,100, 5,796,011, 5,808,209, 6,003,384, 6,053,054, 6,006,609, 6,352,000, 6,397,683, 6,513,393, 6,644,132, 6,651,513, 6,880,410, 6,910,387, US-A 2007/0163361, US-A 2005/0092101, WO-A 88/02,476, WO-A 88/02,853, WO-A 95/16,897, WO-A 00/36,379, WO-A 00/14,485, WO-A 01/02816 or WO-A 02/086 426, among others.

For registering the respective measured variables, measuring systems of the type in discussion here include a corresponding transducer, which is inserted into the course of a process line conveying a medium, in order to produce at least one measurement signal, especially an electric signal, representing the primarily measured variable as accurately as possible. To this end, the measuring transducer normally includes a measuring tube, which is inserted into the course of the pipeline and serves for conveying flowing medium, and a corresponding physical-to-electrical sensor arrangement. The sensor arrangement, in turn, includes at least one sensor element reacting primarily to the variable to be measured, or to changes of the same, in order to produce, during operation, at least one measurement signal appropriately influenced by the measured variable.

For further processing or evaluation of the at least one measurement signal, the transducer is additionally connected with a measuring electronics appropriately suited for this purpose. The measuring electronics, communicating with the measuring transducer in suitable manner, produces, during operation of the measuring system, at least at times, using the at least one measurement signal, at least one measured value instantaneously representing the measured variable, thus, for example, a measured value of mass flow, volume flow, density, viscosity, pressure, temperature, or the like.

To accommodate the measuring electronics, such measuring systems additionally include an appropriate electronics housing, which, as proposed e.g. in U.S. Pat. No. 6,397,683 or WO-A 00/36 379, can be arranged remotely from the measuring transducer and connected with it only by means of a flexible cable. Alternatively, however, as also shown e.g. in EP-A 903 651 or EP-A 1 008 836, for forming a compact in-line measuring device (for example a Coriolis mass flow/density measuring device, an ultrasonic flow-measuring device, a vortex flow-measuring device, a thermal flow-measuring device, a magneto-inductive flow-measuring device, or the like), the electronics housing can be arranged directly on the measuring transducer, or on a transducer housing separately housing the measuring transducer. In the latter case, the electronics housing, as shown, for example, in EP-A 984 248, U.S. Pat. Nos. 4,716,770, or 6,352,000, often also serves to contain some mechanical components of the measuring transducer, such as e.g. membrane-, rod-, sleeve- or tube-shaped, deformation or vibration bodies which are deformed by mechanical effects during operation; compare, in this connection, the U.S. Pat. No. 6,352,000, mentioned above.

Furthermore, measuring systems of the type described are normally connected, via a data transfer system linked to the measuring electronics, with one another and/or with appropriate process control computers, to which they transmit the measured value signals e.g. via (4 mA to 20 mA) current loop and/or a digital data bus. Serving, in such case, as data transmission systems are fieldbus systems, especially serial fieldbus systems, such as e.g. PROFIBUS-PA, FOUNDATION FIELDBUS, along with the corresponding transmission protocols. By means of the process control computers, the transmitted measured value signals can be further processed and visualized as corresponding measurement results e.g. on monitors, and/or converted into control signals for process control elements, such as e.g. magnetic valves, electric motors, etc.

As also discussed in, among others, GB-A 21 42 725, U.S. Pat. No. 5,808,209, US-A 2005/0092101, U.S. Pat. Nos. 6,880,410, 6,644,132, 6,053,054, 6,644,132, 5,052,229 or 6,513,393, in-line measuring devices and, in this respect, also measuring systems of the type described, can, quite likely, have an accuracy of measurement dependent, more or less, on the type of flow. Of special interest in this connection is particularly the instantaneous character of the flow profile in the measuring tube. Considering that turbulent flows, thus flows with a Reynolds number greater than 2300, are largely similar to one another over a broad Reynolds number range, and, as a result, have a comparable effect on measurement accuracy, a high flow velocity of the medium to be measured is often desired in many measuring systems. To achieve a sufficiently high level of measuring accuracy in the case of vortex flow-measuring devices, one usually wants flows which have a Reynolds number much higher than 4000.

Thus, in the case of measuring systems of the type under discussion, it is quite usual, at least in the case of process lines of comparatively larger caliber and/or in applications with comparatively slower flowing media, to construct the measuring tube, if necessary, such that it has a smaller flow cross-section than a supply segment of the process line connected to the inlet side of the measuring system. As a result, the flowing medium experiences an acceleration in the flow direction, whereby, in turn, the Reynolds number is increased. Implementation of this principle has proven itself especially also in the case of measuring systems which function by means of an ultrasonic measuring device, and/or a vortex flow-measuring device, and/or which are provided for the measurement of at least partially, especially predominantly or entirely, gaseous media.

Considering that, for example, the relationship between the shedding rate of vortices on a flow-opposing, bluff body and the therewith primarily to be registered, measured variable, i.e. volume flow rate or flow velocity, which relationship forms the basis upon which vortex flow-measuring devices operate, can only first be accepted as linear to an adequate degree once a Reynolds number of 20,000 has been surpassed, it may be necessary to implement a comparatively great difference between the flow cross sections of the process line and the measuring tube. In other words, for this Reynolds number range, the Strouhal number representing the aforementioned relationship can be considered as essentially constant.

In order to create over a shortest-possible distance a transition zone which is as well-defined as possible, from the supply segment to the measuring tube with its smaller flow cross section, it is usual, as also proposed in, among others, GB-A 21 42 725, U.S. Pat. No. 5,808,209, or US-A 2005/0092101, to provide in the measuring system a flow conditioner having a lumen tapering toward the measuring tube. During operation, the medium flows through such lumen. The flow conditioner is arranged on the inlet side of the measuring tube, and mediates between the measuring tube and the supply segment of the process line. An inlet-end of the flow conditioner, facing the supply segment of the process line, has, in such case, a flow cross section which is greater than the flow cross section of the measuring tube, while an outlet-end of the flow conditioner, facing the measuring tube, accordingly has a flow cross section which is smaller than that of the inlet end.

Especially in U.S. Pat. No. 5,808,209, as well as also in US-A 2005/0092101, it is further indicated in connection with the flow conditioners presented in each case, that the transition realized between the two differently sized flow cross sections must be kept continuous and absolutely free of interruptions, such as, for example vortex-causing edges.

This can be ensured to a quite satisfactory degree by relatively complex processing of the surfaces of the flow conditioner, and of the possibly present joints in the inlet region of the measuring system. However, it has been found that, despite the use of flow conditioners of the type named above, already minor disturbances of the flow in the inlet region of the measuring system, especially also in the supply segment of the connected process line located upstream of the measuring system, or in the region of the connection flange on the inlet side, which, if needed, serves to connect the supply segment and the measuring system, are associated with a significant variation of the flow conditions inside the measuring tube lumen, and, thus, with a corresponding decline in the accuracy of measurement.

Superficially, a possibility for eliminating this problem is to perform a matching processing also of the inlet region of the measuring system, and thus of the supply segment of process line, or of the flange connection at the inlet. This processing, however, is practically impossible to carry out, at any rate not without further demands on the user of the measuring system. This especially is the case because the choice of the measuring system can result from the fact that, in an existing plant, a previously-installed and with respect to the actual flow conditions possibly over-sized measuring system is to be ad hoc replaced. In this respect, the actual installation conditions for the measuring system are to be considered not only unforeseeable, but also, as a practical matter, both not adaptable, and, as a result, also not controllable.

A further possibility for avoiding this problem is to increase the installed length of the flow conditioner in order to achieve, in the flow conditioner, a large degree of stabilizing and quieting of the flow, as early as possible, before it enters the measuring tube. However, this can mean a considerable increase in the installed length of the total measuring system. Considering the situation named above, in which an existing, conventional measuring system is to be replaced by one with a flow conditioner connected upstream, the installed length for the measuring system is more or less predetermined, and thus an increase in the installed length of the flow conditioner is possible only within this rather limited context. Given the disadvantages of conventional flow conditioners, it is no wonder that the range of application of measuring systems of the type in discussion is still seen as rather limited.

SUMMARY OF THE INVENTION

An object of the invention, therefore, is to provide a measuring system for a flowing medium, which, in the context of shortest possible installed length, enables an increase of the Reynolds number of the flow from the process line to the measuring tube, and which, notwithstanding, has a measuring accuracy which is largely insensitive to possible disturbances in the flowing medium upstream of the measuring system, whether in the supply segment and/or in the immediate transition zone between the process line and the actual measuring system.

To achieve this object, the invention resides in a measuring system inserted into the course of a process line, especially a pipeline, for registering at least one measured variable, especially a mass flow, a volume flow, a flow velocity, a density, a viscosity, a pressure, a temperature, and/or the like, of a medium flowing in the process line, which measuring system comprises:

A measuring transducer, including a measuring tube, especially a straight measuring tube, which serves for conveying the medium to be measured and which has a smaller flow cross section than a supply segment of the process line connected to an inlet of the measuring system, and a sensor arrangement, having at least one sensor element reacting primarily to the variable to be registered, especially to changes of the same, and providing, by means of the at least one sensor element, at least one measurement signal influenced by the measured variable;

a measuring electronics communicating with the measuring transducer and producing, at least at times, taking into consideration the at least one measurement signal, at least one measured value instantaneously representing the measured variable, especially a mass flow measured value, a volume flow measured value, a density measured value, a viscosity measured value, a pressure measured value, a temperature measured value; and a flow conditioner arranged at an inlet of the measuring tube, mediating between the measuring tube and the supply segment of the process line, having a lumen which tapers toward the measuring tube, and through which medium flows during operation;

wherein an inlet end of the flow conditioner, facing the supply segment of the process line, has a flow cross section which is greater than the flow cross section of the measuring tube, and an outlet end of the flow conditioner, facing toward the measuring tube, has a flow cross section which is smaller than the flow cross section of the inlet end of the flow conditioner; and wherein at least one impingement surface is provided in the flow conditioner, arranged upstream of the outlet end of the flow conditioner, and protruding into its lumen, especially an impingement surface extending circumferentially along a directrix of the flow conditioner, or a circular impingement surface, against which medium to be measured flows during operation.

Furthermore, the invention resides in a method for registering at least one measured variable, especially a mass flow, a volume flow, a flow velocity, a density, a viscosity, a pressure, a temperature, and/or the like, of a medium flowing in a process line, by means of a measuring system inserted into the course of the process line and having a flow conditioner connected to a supply segment of the process line, as well as a measuring transducer connected to the flow conditioner, which method includes the following steps:

allowing the medium to be measured to flow out of the supply segment into the flow conditioner;

partially blocking medium flowing into the flow conditioner and inducing at least one essentially stationary, especially also essentially locationally fixed, toroidal vortex within medium flowing in an inlet region of the flow conditioner in a manner such that a principal axis of greatest inertia of the at least one toroidal vortex essentially coincides with the longitudinal axis of the flow conditioner, and/or a longitudinal axis of a measuring tube of the measuring transducer;

allowing the medium to be measured to flow past the at least one toroidal vortex, and allowing the medium to be measured to flow out of the flow conditioner and into the measuring tube of the measuring transducer, as well as producing at least one measurement signal influenced by the measured variable to be registered by application of at least one sensor element which reacts primarily to the measured variable, especially also to changes in the same.

In a first embodiment of the measuring system of the invention, it is provided that the impingement surface is so arranged and oriented in the flow conditioner, that it extends, at least sectionally, essentially perpendicularly to a longitudinal axis of the flow conditioner and/or that it extends sectionally essentially perpendicularly to a longitudinal axis of the measuring tube.

In a second embodiment of the measuring system of the invention, it is provided that the impingement surface has in a radial direction, a height amounting to at least 1 mm.

In a third embodiment of the measuring system of the invention, it is provided that the impingement surface is formed as an annular surface.

In a fourth embodiment of the measuring system of the invention, it is provided that the impingement surface and the inner edge are formed, at least in part, by a shoulder, especially a circular and/or self-closing shoulder, formed on the inlet of the flow conditioner.

In a fifth embodiment of the measuring system of the invention, it is provided that the impingement surface is formed, at least sectionally, essentially planarly.

In a sixth embodiment of the measuring system of the invention, it is provided that the impingement surface is so arranged and oriented in the flow conditioner that it is sectionally essentially coplanar to a cross section of the flow conditioner and/or it is sectionally essentially coplanar with a cross section of the measuring tube.

In a seventh embodiment of the measuring system of the invention, it is provided that the impingement surface is at least sectionally formed essentially conically.

In an eighth embodiment of the measuring system of the invention, it is provided that the impingement surface tapers toward the measuring tube.

In a ninth embodiment of the measuring system of the invention, it is provided that the impingement surface is formed widening toward the inlet end of the flow conditioner.

In a tenth embodiment of the measuring system of the invention, it is provided that the impingement surface and the inner edge are at least in part formed by an inner cone formed into the inlet of the flow conditioner, especially an inner cone extending to the inlet end of the flow conditioner and tapering toward the measuring tube.

In an eleventh embodiment of the measuring system of the invention, it is provided that the inner cone forming the impingement surface of the flow conditioner has a flank angle greater than 45°, especially greater than 60°.

In a twelfth embodiment of the measuring system of the invention, it is provided that the inner cone forming the impingement surface of the flow conditioner has a flank angle smaller than 90°, especially smaller than 88°.

In a thirteenth embodiment of the measuring system of the invention, it is provided that the inner cone forming the impingement surface of the flow conditioner has a flank angle greater than 60° and smaller than 88°.

In a fourteenth embodiment of the measuring system of the invention, it is provided that the flow conditioner is essentially circular-cylindrically shaped, at least in an inlet region.

In a fifteenth embodiment of the measuring system of the invention, it is provided that the measuring tube is essentially circular-cylindrically shaped, at least in an inlet region.

In a sixteenth embodiment of the measurement system of the invention, it is provided that the flow conditioner is essentially circular-cylindrically shaped, at least in an outlet region.

In a seventeenth embodiment of the measuring system of the invention, it is provided that the measuring tube, especially the circular-cylindrically shaped measuring tube, is essentially straight.

In an eighteenth embodiment of the measuring system of the invention, it is provided that a cross section ratio of the flow cross section of the supply segment of the process line to the flow cross section of the measuring tube is kept greater than 1.5.

In a nineteenth embodiment of the measuring system of the invention, it is provided that a cross section ratio of the flow cross section of the supply segment of the process line to the flow cross section of the measuring tube is kept smaller than 10.

In a twentieth embodiment of the measuring system of the invention, it is provided that a cross section ratio of the flow cross section of the supply segment of the process line to the flow cross section of the measuring tube is kept in a range between 1.66 and 9.6.

In a twenty-first embodiment of the measuring system of the invention, it is provided that the measuring tube has a smaller caliber than a supply segment of the process line connected to an inlet of the measuring system.

In a twenty-second embodiment of the measuring system of the invention, it is provided that an inlet end of the flow conditioner facing the supply segment of the process line has a caliber which is greater than a caliber of the measuring tube, and an outlet end of the flow conditioner facing the measuring tube has a caliber which is smaller than the caliber of the inlet end of the flow conditioner.

In a twenty-third embodiment of the measuring system of the invention, it is provided that a caliber ratio of the caliber of the supply segment of the process line to the caliber of the measuring tube is kept greater than 1.1.

In a twenty-fourth embodiment of the measuring system of the invention, it is provided that a caliber ratio of the caliber of the supply segment of the process line to the caliber of the measuring tube is kept smaller than 5.

In a twenty-fifth embodiment of the measuring system of the invention, it is provided that a caliber ratio of the caliber of the supply segment of the process line to the caliber of the measuring tube is kept in a range between 1.2 and 3.1.

In a twenty-sixth embodiment of the measuring system of the invention, it is provided that the at least one sensor element is formed by means of at least one piezoelectric element and/or at least one piezoresistive element.

In a twenty-seventh embodiment of the measuring system of the invention, it is provided that the at least one sensor element is formed by means of at least one solenoidal coil associated with an armature.

In a twenty-eighth embodiment of the measuring system of the invention, it is provided that the at least one sensor element is formed by means of at least one measuring electrode contacting medium flowing in the measuring tube and sensing electrical potentials.

In a twenty-ninth embodiment of the measuring system of the invention, it is provided that the at least one sensor element is formed by means of at least one measuring capacitor reacting to changes of the measured variable.

In a thirtieth embodiment of the measuring system of the invention, it is provided that the at least one sensor element is formed by means of at least one electrical resistor.

In a thirty-first embodiment of the measuring system of the invention, it is provided that the at least one sensor element is subjected during operation to repeated mechanical deformations influenced by the medium flowing in the measuring tube.

In a thirty-second embodiment of the measuring system of the invention, it is provided that the at least one sensor element is moved during operation repeatedly relative to a static rest position under the influence of the medium flowing in the measuring tube.

In a thirty-third embodiment of the measuring system of the invention, it is provided that the measuring transducer includes at least one bluff body arranged in the measuring tube.

In a thirty-fourth embodiment of the measuring system of the invention, it is provided that the at least one sensor element of the sensor arrangement, especially a sensor element protruding at least partially into the measuring tube, is arranged downstream of the at least one bluff body.

In a thirty-fifth embodiment of the measuring system of the invention, it is provided that the measuring transducer is embodied as a vortex flow transducer, especially a vortex-street flow transducer.

In a thirty-sixth embodiment of the measuring system of the invention, it is provided that the measuring transducer is embodied as a magneto-inductive flow transducer.

In a thirty-seventh embodiment of the measuring system of the invention, it is provided that the measuring transducer is embodied as a flow transducer of vibration-type, especially a Coriolis mass flow transducer, a density transducer and/or a viscosity transducer.

In a thirty-eighth embodiment of the measuring system of the invention, it is provided that the measuring transducer is embodied as an ultrasonic flow transducer.

In a thirty-ninth embodiment of the measuring system of the invention, it is provided that the measuring tube has an installed length which is greater than an installed length of the flow conditioner, so that an installed length ratio of the installed length of the flow conditioner to the installed length of the measuring tube is kept smaller than one.

In a fortieth embodiment of the measuring system of the invention, it is provided that a caliber ratio of the caliber of the supply segment of the process line to the caliber of the measuring tube corresponds to at least 10% of the installed length ratio of the installed length of the flow conditioner to the installed length of the measuring tube.

In a forty-first embodiment of the measuring system of the invention, it is provided that the at least one sensor element, especially a sensor element immersed in the medium during operation, is arranged at a distance from the inlet end of the measuring tube in and/or on, especially directly on, the measuring tube.

In a forty-second embodiment of the measuring system of the invention, it is provided that the at least one sensor element is so placed, that a ratio of said distance to the caliber of the measuring tube is kept greater than one.

In a forty-third embodiment of the measuring system of the invention, it is provided that the impingement surface is embodied as a spherically formed and/or cleft, especially multiply serrated and/or waved, annular surface.

In a first further development of the measuring system of the invention, a guide surface is provided in the flow conditioner arranged upstream of the impingement surface, extending in the direction of the outlet end of the flow conditioner and serving for guiding medium flowing in the flow conditioner.

In a first embodiment of the first further development of the invention, it is provided that the guide surface, especially a conically shaped guide surface, of the flow conditioner is formed, at least sectionally, convexly.

In a second embodiment of the first further development of the invention, it is provided that the guide surface, especially a conically shaped guide surface, of the flow conditioner is formed, at least sectionally, concavely.

In a third embodiment of the first further development of the invention, it is provided that the guide surface of the flow conditioner has an essentially S-shaped profile.

In a fourth embodiment of the first further development of the invention, it is provided that the guide surface of the flow conditioner tapers toward the measuring tube.

In a fifth embodiment of the first further development of the invention, it is provided that the guide surface of the flow conditioner is formed essentially conically.

In a sixth embodiment of the first further development of the invention, it is provided that an inner cone forming the guide surface of the flow conditioner has a flank angle greater than 2°, especially greater than 4°.

In a seventh embodiment of the first further development of the invention, it is provided that the inner cone forming the guide surface of the flow conditioner has a flank angle smaller than 45°, especially smaller than 10°.

In an eighth embodiment of the first further development of the invention, it is provided that the inner cone forming the guide surface of the flow conditioner has a flank angle greater than 4° and smaller than 10°.

In a ninth embodiment of the first further development of the invention, it is provided that the impingement surface is formed by a first inner cone formed into the inlet of the flow conditioner and extending towards its inlet end, and the guide surface is formed by a second inner cone formed into the inlet of the flow conditioner and extending toward its outlet end. Especially, in such case, it is provided that the first inner cone forming the impingement surface has a flank angle greater than a flank angle of the second inner cone forming the guide surface. For example, the first inner cone forming the impingement surface of the flow conditioner can have a flank angle greater than 45°, especially greater than 60°, and smaller than 90°, especially smaller than 88°, and that the second inner cone forming the guide surface of the flow conditioner can have a flank angle greater than 2°, especially greater than 4°, and smaller than 45°, especially smaller than 10°.

In a second further development of the invention, it is provided that the flow conditioner has at least one inner edge arranged upstream from its outlet end and protruding into the lumen of the flow conditioner. During operation, medium conveyed in the flow conditioner flows against the inner edge. Especially, the inner edge of the flow conditioner extends circumferentially along a directrix of the flow conditioner and/or is circular.

In a first embodiment of the second further development of the invention, it is provided that the at least one inner edge protruding into the lumen of the flow conditioner is so constructed and arranged in the flow conditioner that it is directed essentially transversely to a longitudinal axis of the flow conditioner and/or transversely to a longitudinal axis of the measuring tube.

In a second embodiment of the second further development of the invention, it is provided that the at least one inner edge protruding into the lumen of the flow conditioner is formed circumferentially, especially circularly, and, as a result, closes on itself.

In a third embodiment of the second further development of the invention, it is provided that the at least one inner edge protruding into the lumen of the flow conditioner is arranged in the vicinity, especially the immediate vicinity, of the inlet end of the flow conditioner.

In a fourth embodiment of the second further development of the invention, it is provided that the at least one inner edge protruding into the lumen of the flow conditioner is arranged immediately at the inlet end of the flow conditioner.

In a fifth embodiment of the second further development of the invention, it is provided that the at least one inner edge protruding into the lumen of the flow conditioner has an edge radius smaller than 2 mm, especially smaller than 0.6 mm.

In a sixth embodiment of the second further development of the invention, it is provided that the inner edge has a serrated or waved contour.

In a seventh embodiment of the second further development of the invention, it is provided that a cross section of the lumen of the flow conditioner bounded by the inner edge protruding into the lumen of the flow conditioner is smaller than the flow cross section of the supply segment of the process line.

In an eighth embodiment of the second further development of the invention, it is provided that a constriction ratio of the cross section bounded by the inner edge to the flow cross section of the supply segment of the process line is kept smaller than 0.9.

In a ninth embodiment of the second further development of the invention, it is provided that the constriction ratio of the cross section bounded by the inner edge to the flow cross section of the supply segment of the process line is kept greater than 0.1.

In a tenth embodiment of the second further development of the invention, it is provided that a constriction ratio of the cross section bounded by the inner edge to the flow cross section of the supply segment of the process line is kept in a region between 0.25 and 0.85.

In an eleventh embodiment of the second further development of the invention, it is provided that a contraction ratio of the cross section bounded by the inner edge to the flow cross section of the measuring tube is kept greater than 1.2.

In a twelfth embodiment of the second further development of the invention, it is provided that a contraction ratio of the cross section bounded by the inner edge to the flow cross section of the measuring tube is kept smaller than 5.

In a thirteenth embodiment of the second further development of the invention, it is provided that a contraction ratio of the cross section bounded by the inner edge to the flow cross section of the measuring tube is kept in a range between 1.3 and 3.

In a fourteenth embodiment of the second further development of the invention, it is provided that a difference between a cross section ratio of the flow cross section of the supply segment of the process line to the cross section of the measuring tube and a constriction ratio of the cross section bounded by the inner edge to the flow cross section of the supply segment of the process line is kept greater than 0.5.

In a fifteenth embodiment of the second further development of the invention, it is provided that a difference between a cross section ratio of the flow cross section of the supply segment of the process line to the flow cross section of the measuring tube and a constriction ratio of the cross section bounded by the inner edge to the flow cross section of the supply segment of the process line is kept smaller than 10.

In a sixteenth embodiment of the second further development of the invention, it is provided that a difference between a cross section ratio of the flow cross section of the supply segment of the process line to the flow cross section of the measuring tube and a constriction ration of the cross section bounded by the inner edge to the flow cross section of the supply segment of the process line is kept greater than 0.83 and smaller than 9.5.

In a seventeenth embodiment of the second further development of the invention, it is provided that a difference between a cross section ratio of the flow cross section of the supply segment of the process line to the flow cross section of the measuring tube and a contraction ratio of the cross section bounded by the inner edge to the cross section of the measuring tube is kept greater than 0.2.

In an eighteenth embodiment of the second further development of the invention, it is provided that a difference between a cross section ratio of the flow cross section of the supply segment of the process line to the flow cross section of the measuring tube and a contraction ratio of the cross section bounded by the inner edge to the flow cross section of the measuring tube is kept smaller than 10.

In a nineteenth embodiment of the second further development of the invention, it is provided that a difference between the cross section ratio of the flow cross section of the supply segment of the process line to the cross section of the measuring tube and a contraction ratio of the cross section bounded by the inner edge to the flow cross section of the measuring tube is kept greater than 0.25 and smaller than 8.

In a twentieth embodiment of the second further development of the invention, it is provided that the at least one inner edge protruding into the lumen of the flow conditioner is formed such that an inner diameter of the inlet end of the flow conditioner is kept smaller than the caliber of the supply segment of the process line.

In a twenty-first embodiment of the second further development of the invention, it is provided that a cross section of the lumen of the flow conditioner bounded by the at least one inner edge protruding into the lumen of the flow conditioner has a diameter which is smaller than the caliber of the supply segment of the process line.

In a twenty-second embodiment of the second further development of the invention, it is provided that the at least one inner edge protruding into the lumen of the flow conditioner limits a guide surface of the flow conditioner extending in the direction of the outlet end of the flow conditioner and serving for guiding medium flowing in the flow conditioner.

In a twenty-third embodiment of the second further development of the invention, it is provided that the at least one inner edge protruding into the lumen of the flow conditioner limits the impingement surface arranged in an, especially circularly circumferentially extending, border region of the flow conditioner and serving to cause medium flowing thereagainst to eddy by partial blocking of medium flowing thereon.

In a twenty-fourth embodiment of the second further development of the invention, it is provided that the at least one inner edge protruding into the lumen of the flow conditioner limits an impingement surface of the flow conditioner arranged in a border region of the flow conditioner, especially a circularly circumferential border region, and serving to cause medium flowing thereagainst to eddy by partially blocking medium flowing thereon, as well as also limiting a guide surface of the flow conditioner extending toward the outlet end of the flow conditioner and serving for guiding medium flowing in the flow conditioner.

In a third further development of the measuring system of the invention, it is provided that the flow conditioner has at least one inner edge arranged upstream of its outlet end, protruding into the lumen of the flow conditioner, and, during operation, flowed against by medium conveyed therein, especially an inner edge extending circumferentially along a directrix of the flow conditioner, and that a guide surface is provided in the flow conditioner, arranged downstream of its impingement surface, extending in the direction of the outlet end of the flow conditioner and serving for guiding medium flowing in the flow conditioner, wherein the guide surface and the inner edge are formed, at least in part, by an inner cone formed into the inlet of the flow conditioner, especially an inner cone extending toward the outlet end of the flow conditioner.

In a first embodiment of the method of the invention, the step of partially blocking medium flowing into the flow conditioner further includes a step of allowing medium to flow against an impingement surface of the flow conditioner opposing the flowing medium in a border region of the flow conditioner, especially a border region extending circumferentially closed along a directrix of the flow conditioner, for inducing an essentially stationary toroidal vortex in the inlet region of the flow conditioner.

In a second embodiment of the method of the invention, such further includes steps of accelerating medium flowing in the flow conditioner in the direction of a longitudinal axis of the flow conditioner.

In a third embodiment of the method of the invention, the step of inducing the at least one, essentially stationary, toroidal vortex in the inlet region of the flow conditioner includes steps of allowing medium to flow past an inner edge of the flow conditioner protruding into a lumen of the flow conditioner, especially an inner edge circumferentially closed along a directrix of the flow conditioner.

In a fourth embodiment of the method of the invention, such further includes a step of inducing at least one further, essentially stationary, especially essentially locationally fixed, toroidal vortex in the inlet region of the flow conditioner in such a manner that the principal axis of greatest inertia of each of the at least two toroidal vortices essentially aligns with the other. In a further development of this embodiment of the invention, it is provided that at least one of the steps of inducing of essentially stationary toroidal vortices in the inlet region of the flow conditioner includes steps of allowing medium to flow past an inner edge of the flow conditioner protruding into the lumen of the flow conditioner, especially an inner edge circumferentially closed along one of its directrices.

A basic idea of the invention is to improve measurement accuracy of measuring systems of the described kind not only by sufficiently accelerating the flow and so bringing such into a favorable Reynolds number range, but also by, on the one hand, largely eliminating, by means of the flow conditioner placed before the actual measuring transducer, disturbances, such as e.g. vortices introduced into the flow possibly upstream of the measuring system and entrained, such that they move with the flow, in wall-near regions, and so, on the other hand, by means of the flow conditioner, to bring about new directly before the measuring transducer a largely disturbance insensitive flow profile for the medium flowing into the measuring transducer, namely a flow profile sufficiently well reproducible for the measuring principle.

This is accomplished in the measuring system of the invention especially by producing in its inlet region at least one, essentially toroidal vortex, which, at least in steady state, is kept essentially locationally fixed. This stationary vortex acts, for the medium flowing past, practically as an additional, cross sectional constriction and, as a result, as a "virtual" nozzle, intrinsically formed within the flowing medium.

A special characteristic of such a "virtual" nozzle is that it largely eliminates disturbances possibly induced in the flow upstream of the inlet region. There results downstream, practically anew, a largely undisturbed flow profile. The size and strength of the toroidal vortex even adapts to the size and strength of the incoming disturbance, so that the so-obtained, "virtual" nozzle is practically self-adapting in the sense of being an effective disturbance eliminator.

The invention is based, in such case, on the surprising discovery that a stationary, especially also essentially locationally fixed, vortex can be achieved by means of a flow obstacle placed in the inlet region of the measuring system to act as a defined disturbance (here impinged by the flowing medium as frontally as possible and extending circumferentially, especially circularly, as completely closed as possible) in a border region of the lumen through which the medium is flowing.

The effect of the "virtual" nozzle produced by means of the toroidal vortex can be yet further improved by bringing about, in the flow conditioner downstream from the vortex produced in front of the impingement surface, a further vortex, equally as locationally fixed as possible, located possibly even immediately behind the first vortex. This can be achieved in the case of the flow conditioner of the invention structurally in a very simple manner by providing additionally a sharp inner edge bounding the impingement surface, especially an inner edge equally circularly surrounding the impingement surface, such that it acts as a shedding edge, in a manner sufficient for vortex formation, for the medium flowing past.

By forming two such toroidal vortices, especially ones oriented largely concentrically to one another, it is possible, on the one hand, better to trap vortices entrained in the incoming medium and so to eliminate them more effectively. On the other hand, by means of two such, sequentially arranged, concentric vortices, the effectively active contour of the so formed, "virtual" nozzle practically reaches an S-shape, which favors formation of a well reproducible flow profile very well suited for the subsequent measuring, equally also as applied to a wide range of applications. In this way, it is possible, despite possible disturbed flow in the supply segment, to convey to the measuring transducer via the flow conditioner medium with a flow profile which is at least largely similar to a calibrated situation.

Use of a flow conditioner of the present invention has, for example in the case of the above-described vortex measuring devices, among others, also the advantage that they are, despite relatively great differences between the caliber of the supply segment of the attached process line and the caliber of the measuring tube, e.g. over two nominal diameter levels, suited also for the measurement of relatively slowly flowing gases. This especially since, in this way, at least for the measured volume, especially also for flow profiles which are disturbed in the inlet region of the measuring system, an extensive independence of the Strouhal number can be obtained over the cross section of the measuring tube.

BRIEF DESCRIPTION OF THE DRAWINGS

The invention will now be explained in greater detail on the basis of the drawing, the figures of which show as follows.

DETAILED DESCRIPTION OF EXEMPLARY EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 1:
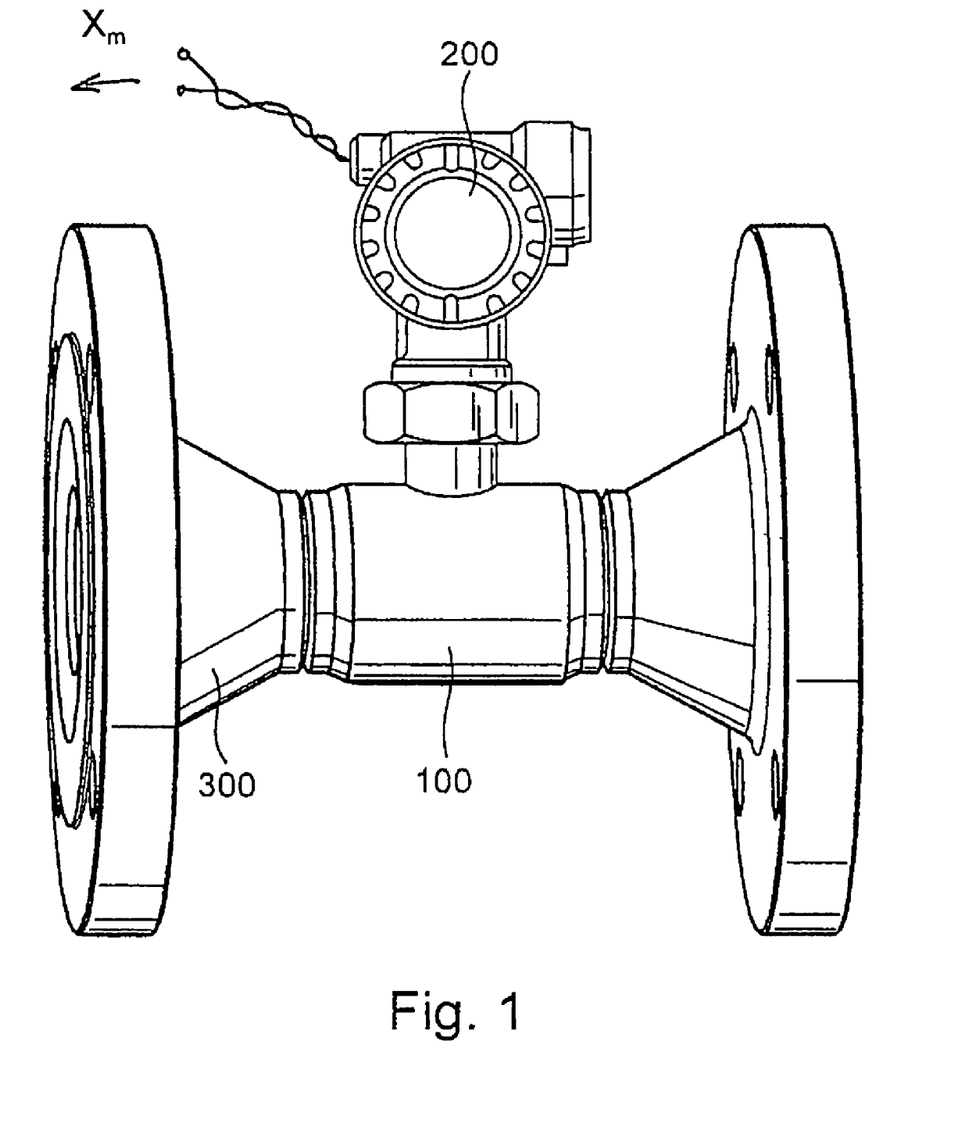
FIG. 1 perspectively, in side view, a measuring system for a medium flowing in a process line.

FIG. 1 shows schematically a measuring system, which may be, to the extent required, modularly assembled. The measuring system is suited for measuring, very robustly, at least one measured variable, especially a mass flow m and/or a volume flow v and/or a flow velocity u and/or some other flow parameter of a medium, for example a liquid, a gas, a vapor, or the like, flowing in a process line (not shown) and for mapping such variable into at least one corresponding, measured value $X_M$. The measuring system includes for such purpose at least one inline measuring device for flowing media. The measuring device is formed by means of a measuring transducer 100 suited for the intended purpose, as well as a measuring electronics electrically coupled, at least at times, therewith. Thus, the inline measuring device includes a measuring transducer 100, through which the medium flows during operation, as well as an electronics housing 200, in which a measuring electronics is accommodated. The measuring electronics is electrically connected with the measuring transducer 100. The exact means of electrical connection does not need to be discussed here.

The measuring transducer 100 includes at least one measuring tube for insertion into the course of the process line. The process line can be in the form of a pipeline, for instance. The medium to be measured is allowed, during operation of the measuring system, to flow, at least at times, through the measuring tube. The inline measuring device is provided especially for producing, at least at times, at least one measurement signal influenced by at least one physical parameter, especially a flow velocity, a mass flow m, a volume flow v, a density $\rho$ and/or a viscosity $\eta$, of the medium present in the measuring tube and, in such respect, appropriately corresponding to the measured variable. Serving, in such case, for producing the at least one measurement signal is a sensor arrangement of the inline measuring device. The sensor arrangement is arranged on the measuring tube and/or in its vicinity, and reacts, at least mediately, to changes of the at least one measured variable of the medium in a manner appropriately influencing the at least one measurement signal.

In an advantageous embodiment of the invention, the measuring electronics is further so embodied that it can, during operation of the measuring system, exchange measurement- and/or other operating-data, especially also the at least one measured value $X_M$, with a measured value processing unit superordinated to the measuring system, especially a programmable logic controller (PLC), a personal computer and/or a workstation, via a data transmission system, for example a fieldbus system. For the aforementioned case in which the measuring system is provided for a coupling to a fieldbus or other communications system, the measuring device electronics has a corresponding communications interface for data communications, e.g. for sending the measurement data to the already mentioned programmable logic controller or a superordinated process control system. Also for this purpose, correspondingly established, standard interfaces of, for example, measurements and automation technology can be used. Moreover, also the external energy, or power, supply can be connected to the fieldbus system, and the measuring system can be supplied in the above described manner directly via the fieldbus system with energy.

In the example of an embodiment shown here, a vortex flow-measuring device serves as an inline measuring device, which, as is known, is well suited for measuring gases, and for the highly accurate registering of the physical, measured variable, especially the mass flow m, density ρ and/or viscosity η, of the medium to be measured. However, in such case, also other inline measuring devices equally established in the technology of process automation can be used, such as e.g. magneto-inductive flow meters, pressure-difference flow meters, ultrasonic flow measuring devices or the like.

Figure 2:
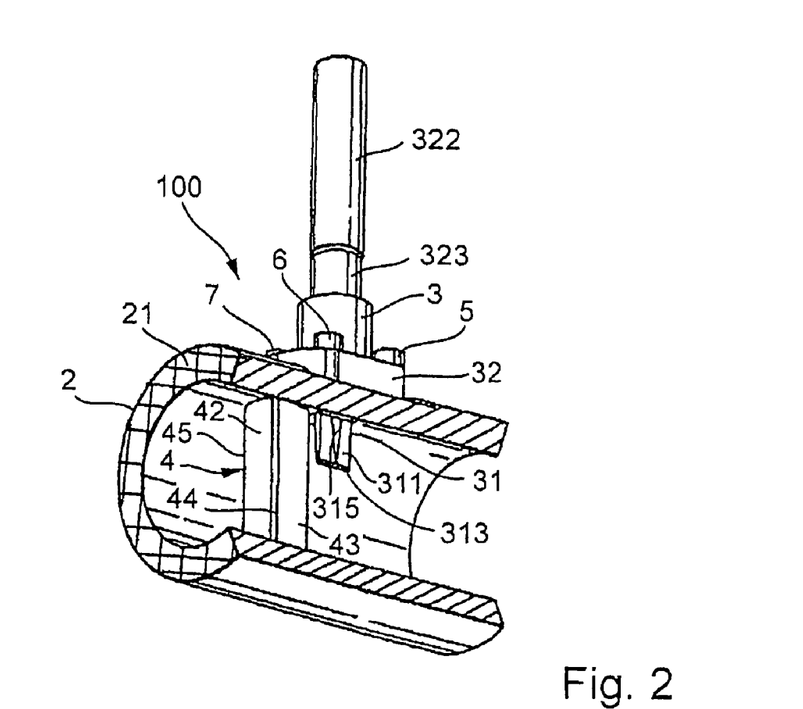
FIGS. 2, 3 a measuring transducer working according to the vortex principle and suited for application in a measuring system of FIG. 1.
Figure 3:
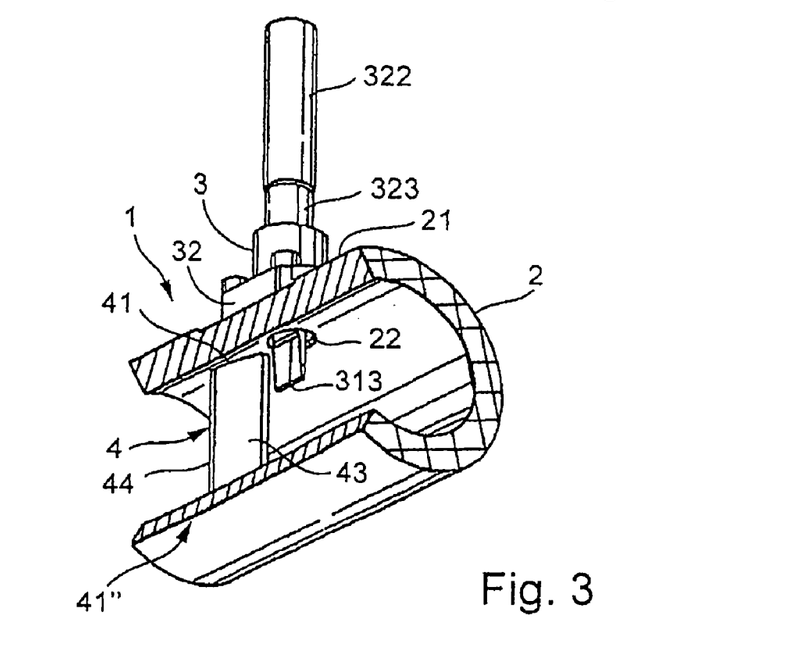

The perspective, general views of FIGS. 2 and 3 of an example of an embodiment of a vortex measuring transducer operating according to the vortex principle show, on the one hand, as seen in the direction of flow (FIG. 2) and on the other hand as seen counter to the direction of flow (FIG. 3), a partially sectioned measuring transducer 1 of a vortex flow-measuring device having affixed to a wall 21 of a measuring tube 2 and protruding through a bore 22, a vortex sensor 3. This can be, for example, a dynamically compensated, vortex sensor with a capacitive sensor element, such as is described in U.S. Pat. No. 6,003,384.

Along a diameter of the measuring tube 2 in its interior is arranged a bluff body 4, which is fixedly connected with the measuring 2 with the formation of an illustrated, first securement location 41 and a hidden, second securement location 41*. The center of the bore 22 and the center of the securement location 41 lie on an element of the measuring tube 2.

Bluff body 4 has an impingement surface 42, against which, during operation, a medium being measured, e.g. a liquid, gas or vapor, flows. The bluff body 4 has, additionally, two lateral surfaces, of which only one (front) side 43, is visible in FIGS. 2 and 3. Two shedding edges are formed by the impingement surface 42 and the lateral surfaces. Only one, (front) shedding edge 44 can be completely seen in FIG. 2, while a (back) shedding edge 45 is indicated but not shown completely.

The bluff body 4 of FIGS. 2 and 3 has essentially the shape of a right column of triangular cross section. It is possible, however, also to use other usual shapes of bluff body for the invention.

By flow of the medium against the impingement surface 42, a Karman vortex street forms in known manner downstream of the bluff body 4, wherein, at each shedding edge, vortices are alternatingly shed and entrained, or carried along, by the flowing medium. The vortices produce local pressure fluctuations in the flowing medium, whose time-referenced shedding frequency, thus their so-called vortex frequency, is a measure for the flow velocity and/or the volume flow rate of the medium.

The pressure fluctuations are converted by means of the vortex sensor 3 into a vortex signal serving as an electrical measurement signal, which is fed to a measuring electronics (not shown) accommodated in the electronics housing. The measuring electronics calculates therefrom, for example, the flow velocity and/or the volume flow of the flowing medium.

Vortex sensor 3 is inserted downstream from the bluff body 4 into the bore 22 in the wall 21 of the measuring tube 2 and seals the bore 22 against escape of medium, for which purpose the vortex sensor 3 is screw-connected with the wall 21. Serving for this purpose are e.g. four screws, of which the screws 5, 6, 7 can be seen in FIGS. 2 and 3. The screws engage in corresponding bores 50, 60, 70, 80.

Vortex sensor 3 includes, as shown in FIGS. 1 and 2, a wedge-shaped sensor vane 31, which protrudes through the bore 22 of wall 21 into the interior of the measuring tube 2, and a housing cap 32. The housing cap 32 ends in an extension 322, with the interposition of a thinner-walled intermediate piece 323; compare the mentioned U.S. Pat. No. 6,003,384.

The sensor vane 31 has main surfaces, of which only the main surface 311 is visible in FIGS. 2 and 3. The main surfaces align with the mentioned generatrix, or element, of the measuring tube 2 and form a front edge 313. The sensor vane 31 can also have other suitable spatial shapes; thus, for instance, it can have e.g. two parallel main surfaces, which form two parallel front edges. The sensor vane 31 is shorter than the diameter of the measuring tube 2; it is, further, flexurally stiff and has a blind hole. In order that blind hole has a sufficient diameter, wall portions extend out of the main surfaces. One of these wall portions, wall portion 315, is indicated in FIG. 2. The blind hole reaches to the vicinity of the front edge 313 and has a floor there.

Also belonging to the vortex sensor 3 is a membrane, or diaphragm, 33 covering the bore 22 and having a first surface facing toward the medium and a second surface facing away from the medium. The sensor vane 31 is affixed to the first surface and a sensor element is affixed to the second surface. Preferably, sensor vane 31, membrane 33, its ring-shaped edge and a part of the sensor element 36 secured to the membrane 33 are manufactured from a single piece of material, e.g. metal, especially stainless steel. Sensor element 36 produces the above-mentioned signal, whose frequency is proportional to the volume flow rate of the flowing medium.

In the measuring system of the invention, the measuring tube, especially a straight measuring tube, serving for conveying the medium being measured, has a smaller flow cross section A1 than a supply segment 400 of the process line connected to the inlet end of the measuring system. Therefore, the measuring system includes, further, a flow conditioner 300 arranged at the inlet end of the measuring tube and mediating between the measuring tube and the supply segment. Flow conditioner 300 has a lumen, through which medium flows during operation. The lumen tapers in the direction of the measuring tube 2. An inlet end of the flow conditioner facing toward the supply segment of the process line has, in such case, a flow cross section a, which is greater than the flow cross section A1 of the measuring tube, while an outlet end of the flow conditioner facing the measuring tube has a flow cross section, which is smaller than the flow cross section of the inlet end of the flow conditioner. During measurement operation, the medium to be measured is allowed to flow out of the supply segment into the flow conditioner and, due to the decreasing flow cross section in the direction of the longitudinal axis of the flow conditioner, the medium is accelerated.

In the case of the measuring system of the invention, the flow conditioner has, furthermore, at least one impingement surface P arranged upstream of its outlet end and protruding into the lumen of the flow conditioner, especially an impingement surface P extending circumferentially along a directrix of the flow conditioner and/or a circular impingement surface P. The impingement surface is, in such case, so constructed and arranged in the flow conditioner that it is flowed against by the medium allowed to flow-in during measurement operation at first practically frontally. Due to the abruptly or jump-like decreasing flow cross section at the impingement surface P, the incoming medium is partially blocked there. As a result, there forms upstream of the impingement surface P an essentially toroidal, at least in steady state essentially locationally fixed, first vortex w2, whose dimensions are determined, on the one hand, by the inlet geometry of the flow conditioner, especially its impingement surface, and, on the other hand, by the flowing medium itself. From a practical point of view, there is thus formed by the vortex w2 in the inlet region of the flow conditioner a virtual nozzle, which is not only essentially steady in its contour, but, also, optimally matched to the actual flow. For the medium continuing to flow through the vortex w2, the vortex w2 has an, on the whole, stabilizing effect, as it essentially steadily smooths out the abrupt cross sectional tapering first caused by the impingement surface P and then transitions into a soft, yet further flow accelerating, lessening of the flow cross section. In an embodiment of the invention, the impingement surface P is further so arranged and oriented in the flow conditioner that it extends at least sectionally essentially perpendicularly to a longitudinal axis of the flow conditioner and/or that it extends sectionally essentially perpendicularly to a longitudinal axis of the supply segment. In this way, the first vortex w2 is advantageously so formed within the medium flowing in the inlet region of the flow conditioner in such a manner that a principal axis of greatest inertia of this vortex w2 essentially coincides with the longitudinal axis of the flow conditioner and/or a longitudinal axis of the supply segment. Since especially good results, especially with respect to locational stability and reproducibility of the vortex w2, can be achieved with a well-developed impingement surface P, such has, in an advantageous embodiment of the invention, a height h2 in the radial direction amounting to at least 1 mm. The impingement surface P can be formed, for example, as an essentially planar, annular surface or even conically, such that it tapers toward the measuring tube and widens toward the process line. In the example of an embodiment shown here, the impingement surface P is, moreover, arranged in the vicinity, especially the immediate vicinity, of the inlet end of the flow conditioner.

In a further development of the invention, the flow conditioner has, in addition to the aforementioned impingement surface P, a vortex forming, inner edge K arranged downstream from the impingement surface P. For the above described case, in which medium flows through the flow conditioner, there forms downstream from the inner edge K, in addition to the first vortex w2, a likewise essentially toroidal, at least in steady state equally essentially locationally fixed, second vortex w1. The inner edge K is, in a further embodiment of the invention, for this purpose, so constructed and arranged in the flow conditioner, that it is oriented essentially transversely to a longitudinal axis of the flow conditioner and/or transversely to a longitudinal axis of the measuring tube. Further, the inner edge K is formed circumferentially, especially circularly, and, as a result, closes on itself.

In the example of an embodiment shown here, as a result of the positioning of the impingement surface P in the vicinity, especially the immediate vicinity, of the inlet end of the flow conditioner, also the inner edge K is located in its inlet region. Since especially good results can be achieved with a well-developed, relatively sharp, inner edge, the inner edge has, in an advantageous embodiment, an edge radius which is smaller than 2 mm, especially smaller than 0.6 mm.

For further improvement of the flow profile, it can, additionally, be of advantage to construct the impingement surface as a spherically formed and/or clefted, especially serrated, or waved, annular surface and/or to provide the inner edge with a serrated or waved contour, whereby a yet further increased mixing of medium flowing onto, or past, can be achieved and, as a result, a more drastic reforming of the flow profile.

Figure 4:
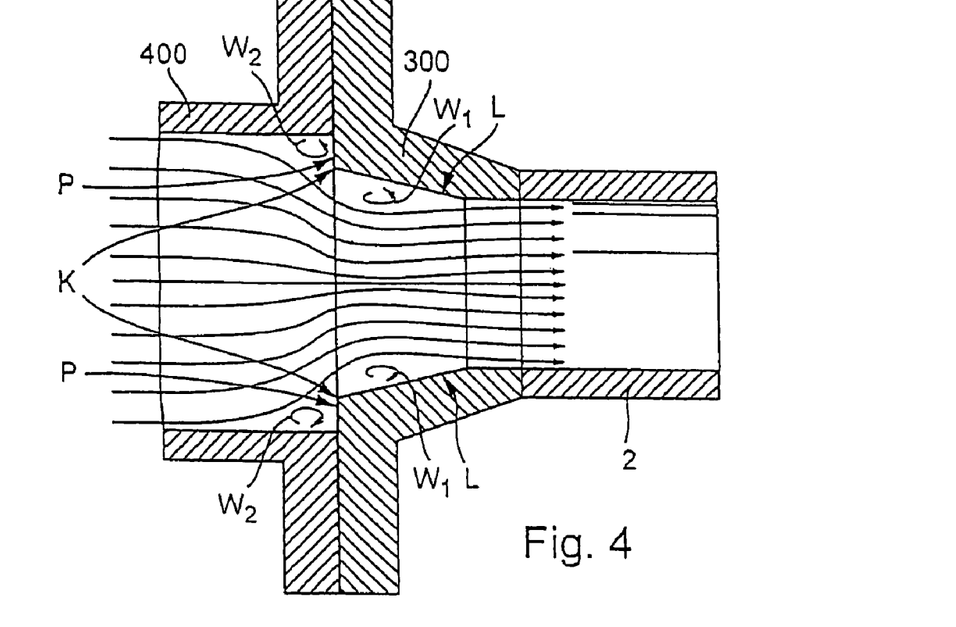
FIGS. 4 to 8 schematically in cross section, details of the measuring system of FIG. 1.
Figure 5:
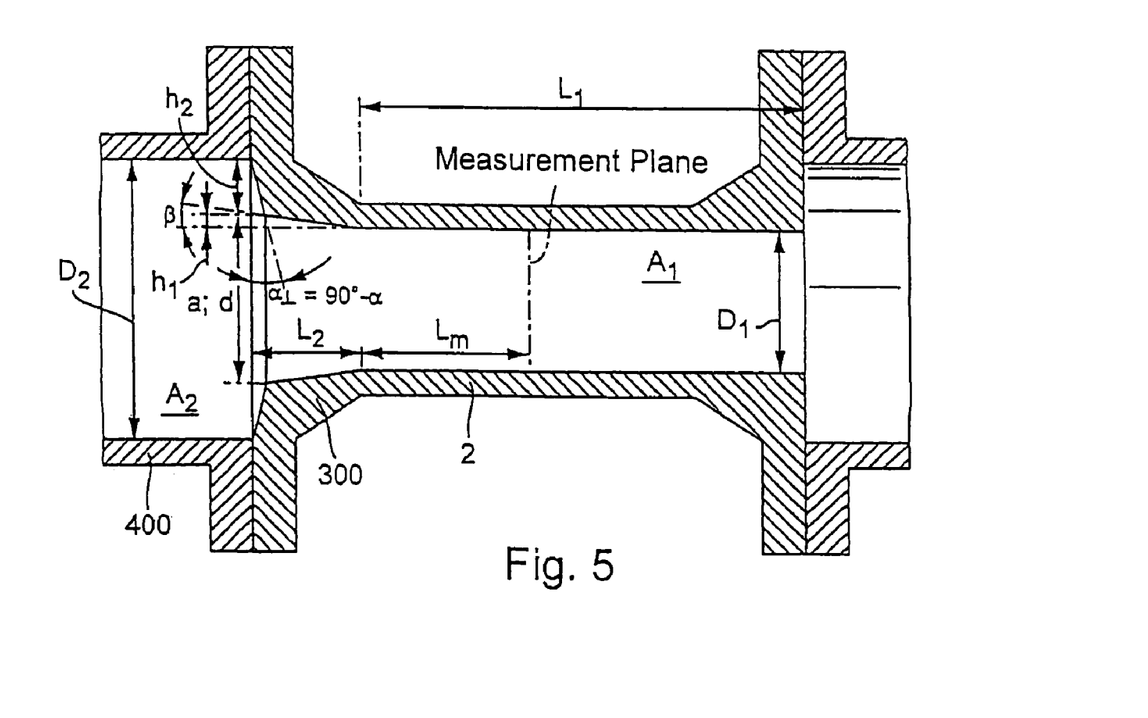
Figure 6:
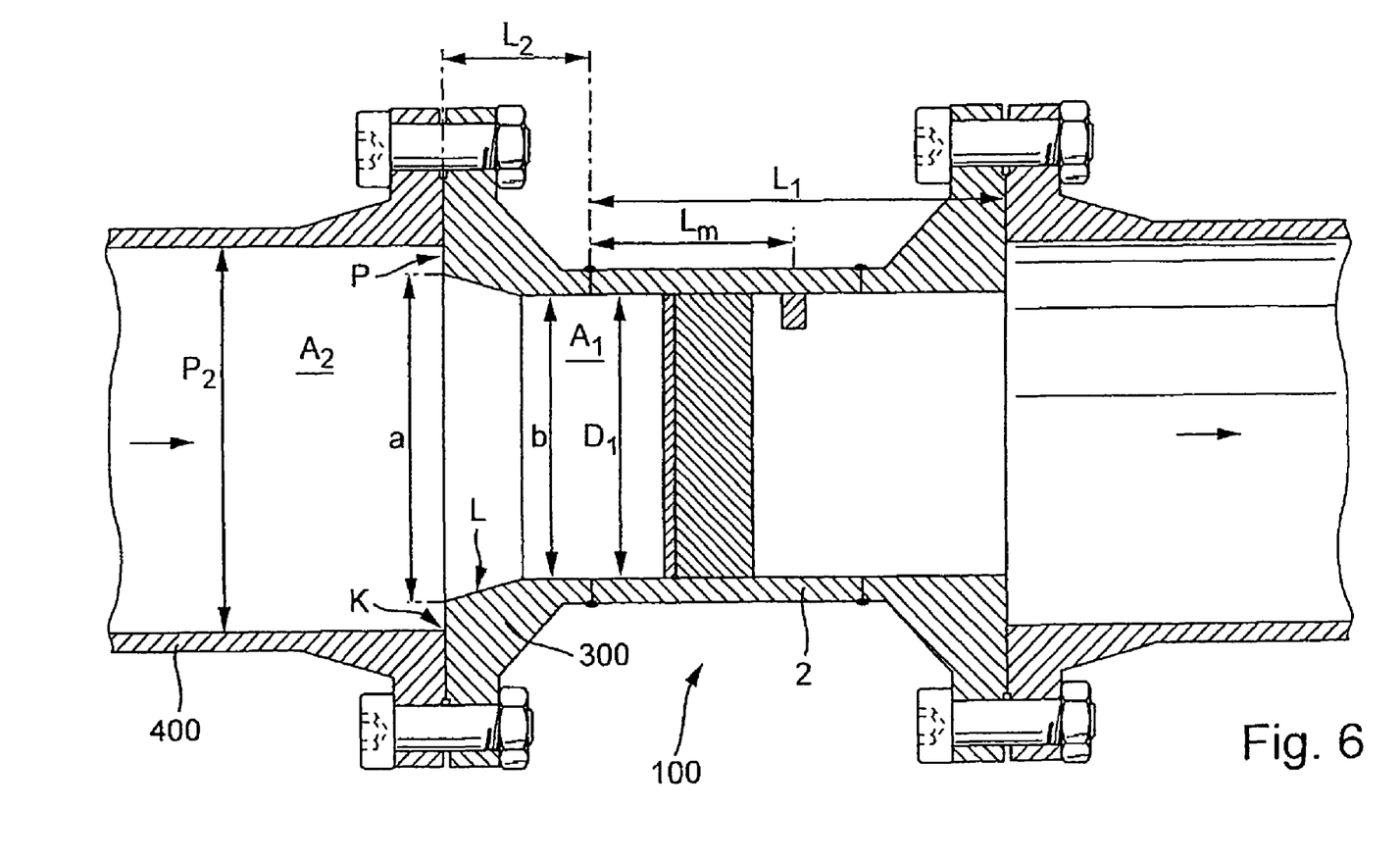
Figure 7:
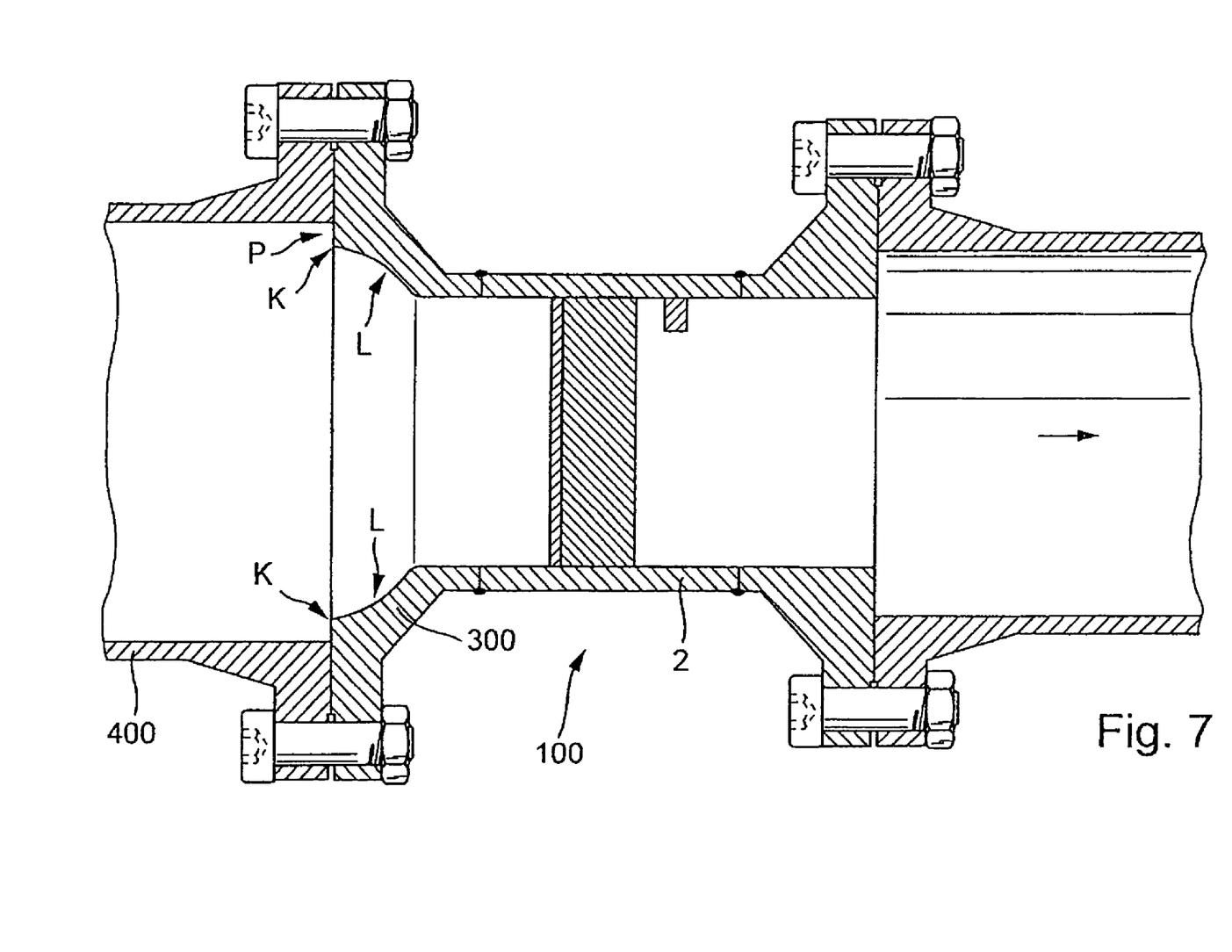
Figure 8:
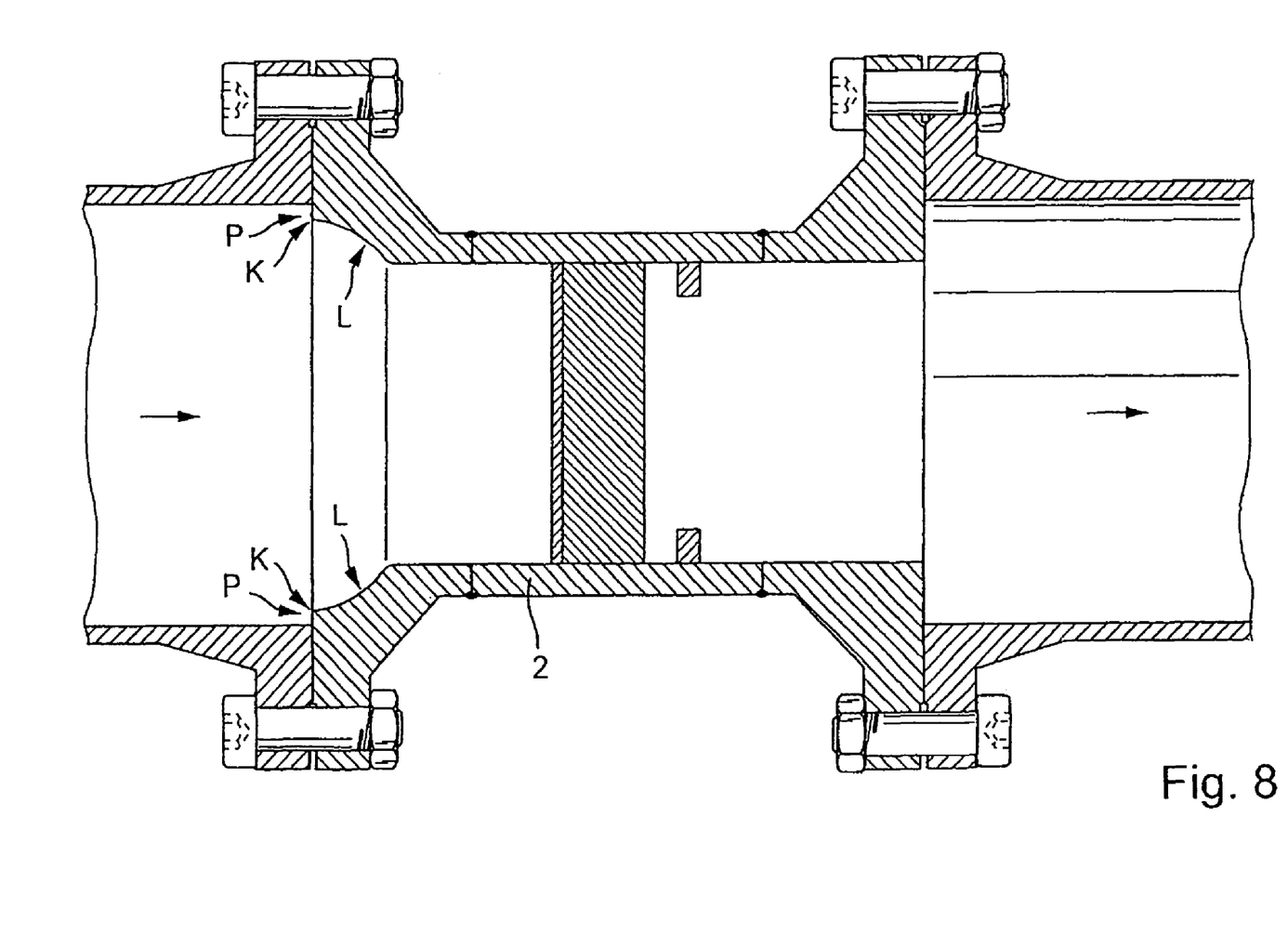

As can be seen in FIG. 4, the second vortex w1 producing, inner edge K is formed by intersection of the impingement surface P practically without transition, thus without a soft or continuous transition, with a guide surface L extending in the direction of the outlet end of the flow conditioner and serving for guiding medium flowing in the flow conditioner. Guide surface L is, in turn, itself limited by the inner edge K. The guide surface L tapering toward the measuring tube can, for example, as also in fact shown in FIGS. 4 to 8, be formed essentially conically, especially such that it is, at least sectionally, convex and/or sectionally concave, for example thus has an essentially S-shaped profile (FIG. 7). In the example of an embodiment shown here, the impingement surface P, and, as a result, also the inner edge K, are formed in simple manner by keeping the inner diameter of the inlet end of the flow conditioner smaller than the caliber of the supply segment of the process line.

The inner edge K is, in a further embodiment of the invention, further so constructed that the second vortex w1 in the medium flowing therepast is formed in such a manner that a principal axis of greatest inertia of the vortex w1 essentially coincides with the longitudinal axis of the flow conditioner and/or a longitudinal axis of the measuring tube. For medium flowing past the vortex w1, such acts both further cross section narrowingly as well as also mediatingly in the direction of the guide surface L and, as a result, stabilizes the flow profile.

For the case shown here, in which at least one other essentially stationary, especially essentially locationally fixed, toroidal vortex is induced in the inlet region of the flow conditioner, there results, in addition to the soft cross sectional lessening created by the first vortex w2, effectively an additional, equally steady, cross sectional narrowing and, as a result, also a yet further increased acceleration of the medium flowing through the toroidal vortices stationed in the inlet region, accompanied by an increasing of its Reynolds number. In the configuration of the measuring system shown here, in which the lumen of the flow conditioner defined by a cone essentially rotationally symmetric about its longitudinal axis and the longitudinal axes of the supply segment and the flow conditioner essentially coincide with one another, the two vortices w2, w1 so form, that the principal axis of greatest inertia of each of the two vortices w1, w2 essentially align with one another. This leads, in turn, to the fact that, in advantageous manner, also the virtual nozzle thus formed in the inlet region is also essentially rotationally symmetric with reference to the longitudinal axis of the flow conditioner. This has, among others, the advantage that the flow profile formed by means of such a nozzle is likewise essentially rotationally symmetric. Thereby, it is possible, in turn, to achieve that, especially in the attached measuring tube, the Strouhal number is kept essentially constant over the tube cross section. Associated with this, on the one hand, the flow conditions in the medium to be measured can be held stable over a wide range of applications and thus kept well reproducible or also predictable. On the other hand, also for many applications with disturbed flow profiles at the inlet, one can proceed on the basis of a Strouhal number, which is kept, to a good approximation, constant over a wide range of applications, or only varies in known manner as a function of the Reynolds number.

Further advantageous embodiments and special developments, especially also dimensioning found to be advantageous for the individual elements of the flow conditioner of the invention, are presented in the following Tables 1, 2, as well as also in the appended claims, wherein the following holds:

A1—flow cross section of the measuring tube;
A2—flow cross section of the supply segment of the process line;
A2/A1—cross section ratio of the flow cross section A2 of the supply segment of the process line to the flow cross section A1 of the measuring tube;
a—cross section of the lumen of the flow conditioner bounded by the inner edge K;

a/A1—contraction ratio of the cross section a bounded by the inner edge to the cross section A1 of the measuring tube;
A2/A1−a/A1—difference between the cross section ratio A2/A1 and the contraction ratio a/A1;
a/A2—constriction ratio of the cross section a bounded by the inner edge to the flow cross section A2 of the supply segment of the process line;
A2/A1−a/A2—difference between the cross section ratio A2/A1 and the constriction ratio a/A2;
D1—caliber of the measuring tube;
D2—caliber of the supply segment of the process line connected to the inlet of the measuring system;
D2/D1—caliber ratio of the caliber D2 of the supply segment of the process line to the caliber D1 of the measuring tube;
d—diameter of the cross section of the lumen of the flow conditioner bounded by the inner edge K;
L1—installed length of the measuring tube;
L2—installed length of the flow conditioner;
Lm—separation of the sensor element from the inlet end of the measuring tube;
α—flank angle of an inner cone forming the impingement surface of the flow conditioner ($\alpha = 90° - \alpha_\perp$); and
β—flank angle of an inner cone forming the guide surface of the flow conditioner.

TABLE 1

| D1 | D2/D1 | d/D1 | D2/d | A2/A1 | a/A1 | a/A2 | (A2-a)/A1 | (a-A1)/A2 | (A2-a)/a | (a-A1)/A1 |
|---|---|---|---|---|---|---|---|---|---|---|
| 15 min | 1.75 | 1.58 | 1.10 | 3.06 | 2.51 | 0.26 | 0.55 | 0.16 | 0.22 | 1.51 |
| 15 max | 3.10 | 1.58 | 1.96 | 9.61 | 2.51 | 0.82 | 7.11 | 0.49 | 2.84 | 1.51 |
| 25 min | 1.57 | 1.23 | 1.27 | 2.46 | 1.52 | 0.30 | 0.93 | 0.10 | 0.61 | 0.52 |
| 25 max | 2.24 | 1.23 | 1.82 | 5.03 | 1.52 | 0.62 | 3.51 | 0.21 | 2.30 | 0.52 |
| 40 min | 1.29 | 1.18 | 1.09 | 1.67 | 1.40 | 0.30 | 0.27 | 0.08 | 0.20 | 0.40 |
| 40 max | 2.17 | 1.18 | 1.83 | 4.69 | 1.40 | 0.84 | 3.29 | 0.24 | 2.36 | 0.40 |
| 50 min | 1.50 | 1.15 | 1.30 | 2.24 | 1.32 | 0.28 | 0.93 | 0.07 | 0.70 | 0.32 |
| 50 max | 2.18 | 1.15 | 1.90 | 4.74 | 1.32 | 0.59 | 3.42 | 0.14 | 2.59 | 0.32 |
| 80 min | 1.32 | 1.18 | 1.11 | 1.73 | 1.39 | 0.30 | 0.34 | 0.08 | 0.24 | 0.39 |
| 80 max | 2.16 | 1.18 | 1.83 | 4.67 | 1.39 | 0.80 | 3.28 | 0.23 | 2.35 | 0.39 |
| 100 min | 1.51 | 1.15 | 1.31 | 2.27 | 1.33 | 0.29 | 0.94 | 0.07 | 0.71 | 0.33 |
| 100 max | 2.14 | 1.15 | 1.85 | 4.57 | 1.33 | 0.59 | 3.23 | 0.15 | 2.43 | 0.33 |
| 150 min | 1.41 | 1.39 | 1.02 | 1.99 | 1.92 | 0.61 | 0.07 | 0.29 | 0.04 | 0.92 |
| 150 max | 1.78 | 1.39 | 1.28 | 3.17 | 1.92 | 0.96 | 1.25 | 0.46 | 0.65 | 0.92 |
| 200 min | 1.32 | 1.15 | 1.02 | 1.73 | 1.33 | 0.29 | 0.07 | 0.07 | 0.04 | 0.33 |
| 200 max | 2.16 | 1.39 | 1.85 | 4.67 | 1.92 | 0.96 | 3.28 | 0.46 | 2.43 | 0.92 |
| 250 min | 1.32 | 1.15 | 1.02 | 1.73 | 1.33 | 0.29 | 0.07 | 0.07 | 0.04 | 0.33 |
| 250 max | 2.16 | 1.39 | 1.85 | 4.67 | 1.92 | 0.96 | 3.28 | 0.46 | 2.43 | 0.92 |
| 300 min | 1.32 | 1.15 | 1.02 | 1.73 | 1.33 | 0.29 | 0.07 | 0.07 | 0.04 | 0.33 |
| 300 max | 2.16 | 1.39 | 1.85 | 4.67 | 1.92 | 0.96 | 3.28 | 0.46 | 2.43 | 0.92 |
| 350 min | 1.32 | 1.15 | 1.02 | 1.73 | 1.33 | 0.29 | 0.07 | 0.07 | 0.04 | 0.33 |
| 350 max | 2.16 | 1.39 | 1.85 | 4.67 | 1.92 | 0.96 | 3.28 | 0.46 | 2.43 | 0.92 |
| 400 min | 1.32 | 1.15 | 1.02 | 1.73 | 1.33 | 0.29 | 0.07 | 0.07 | 0.04 | 0.33 |
| 400 max | 2.16 | 1.39 | 1.85 | 4.67 | 1.92 | 0.96 | 3.28 | 0.46 | 2.43 | 0.92 |
| 500 min | 1.32 | 1.15 | 1.02 | 1.73 | 1.33 | 0.29 | 0.07 | 0.07 | 0.04 | 0.33 |
| 500 max | 2.16 | 1.39 | 1.85 | 4.67 | 1.92 | 0.96 | 3.28 | 0.46 | 2.43 | 0.92 |
| 600 min | 1.32 | 1.15 | 1.02 | 1.73 | 1.33 | 0.29 | 0.07 | 0.07 | 0.04 | 0.33 |
| 600 max | 2.16 | 1.39 | 1.85 | 4.67 | 1.92 | 0.96 | 3.28 | 0.46 | 2.43 | 0.92 |

TABLE 2

| D1 | (A2/A1) − (a/A1) | (A2/A1) − (a/A2) | (D2-d)/D1 | (d-D1)/D2 | (D2-d)/d | (d-D1)//D1 | (D2/D1) − (d/D2) | L1/D2 | L1/D1 | L2/D2 | L2/D1 |
|---|---|---|---|---|---|---|---|---|---|---|---|
| 15 min | 0.55 | 2.24 | 0.17 | 0.19 | 0.10 | 0.58 | 0.84 | 3.75 | 11.62 | 0.89 | 2.77 |
| 15 max | 7.11 | 9.35 | 1.52 | 0.33 | 0.96 | 0.58 | 2.59 | 6.64 | 11.62 | 1.59 | 2.77 |
| 25 min | 0.93 | 1.84 | 0.33 | 0.10 | 0.27 | 0.23 | 0.78 | 3.17 | 7.11 | 0.50 | 1.12 |
| 25 max | 3.51 | 4.73 | 1.01 | 0.15 | 0.82 | 0.23 | 1.69 | 4.54 | 7.11 | 0.71 | 1.12 |
| 40 min | 0.27 | 0.83 | 0.11 | 0.08 | 0.09 | 0.18 | 0.38 | 2.03 | 4.39 | 0.40 | 0.86 |
| 40 max | 3.29 | 4.39 | 0.98 | 0.14 | 0.83 | 0.18 | 1.62 | 3.40 | 4.39 | 0.67 | 0.86 |
| 50 min | 0.93 | 1.66 | 0.35 | 0.07 | 0.30 | 0.15 | 0.73 | 2.00 | 3.36 | 0.32 | 0.71 |
| 50 max | 3.42 | 4.46 | 1.03 | 0.10 | 0.90 | 0.15 | 1.65 | 2.24 | 4.38 | 0.47 | 0.71 |
| 80 min | 0.34 | 0.93 | 0.14 | 0.08 | 0.11 | 0.18 | 0.42 | 1.49 | 2.53 | 0.40 | 0.86 |
| 80 max | 3.28 | 4.37 | 0.98 | 0.14 | 0.83 | 0.18 | 1.62 | 1.93 | 3.21 | 0.65 | 0.86 |
| 100 min | 0.94 | 1.69 | 0.35 | 0.07 | 0.31 | 0.15 | 0.74 | 1.10 | 2.36 | 0.34 | 0.74 |
| 100 max | 3.23 | 4.28 | 0.98 | 0.10 | 0.85 | 0.15 | 1.60 | 1.56 | 2.36 | 0.49 | 0.74 |
| 150 min | 0.07 | 1.03 | 0.03 | 0.22 | 0.02 | 0.39 | 0.43 | 0.15 | 0.22 | 1.03 | 1.83 |
| 150 max | 1.25 | 2.56 | 0.39 | 0.27 | 0.28 | 0.39 | 1.00 | 0.45 | 0.76 | 1.30 | 1.83 |
| 200 min | 0.07 | 0.93 | 0.03 | 0.07 | 0.02 | 0.15 | 0.42 | 0.15 | 0.22 | 0.34 | 0.74 |
| 200 max | 3.28 | 4.37 | 0.98 | 0.27 | 0.85 | 0.39 | 1.62 | 1.93 | 3.21 | 1.30 | 1.83 |
| 250 min | 0.07 | 0.93 | 0.03 | 0.07 | 0.02 | 0.15 | 0.42 | 0.15 | 0.22 | 0.34 | 0.74 |
| 250 max | 3.28 | 4.37 | 0.98 | 0.27 | 0.85 | 0.39 | 1.62 | 1.93 | 3.21 | 1.30 | 1.83 |
| 300 min | 0.07 | 0.93 | 0.03 | 0.07 | 0.02 | 0.15 | 0.42 | 0.15 | 0.22 | 0.34 | 0.74 |
| 300 max | 3.28 | 4.37 | 0.98 | 0.27 | 0.85 | 0.39 | 1.62 | 1.93 | 3.21 | 1.30 | 1.83 |
| 350 min | 0.07 | 0.93 | 0.03 | 0.07 | 0.02 | 0.15 | 0.42 | 0.15 | 0.22 | 0.34 | 0.74 |
| 350 max | 3.28 | 4.37 | 0.98 | 0.27 | 0.85 | 0.39 | 1.62 | 1.93 | 3.21 | 1.30 | 1.83 |
| 400 min | 0.07 | 0.93 | 0.03 | 0.07 | 0.02 | 0.15 | 0.42 | 0.15 | 0.22 | 0.34 | 0.74 |
| 400 max | 3.28 | 4.37 | 0.98 | 0.27 | 0.85 | 0.39 | 1.62 | 1.93 | 3.21 | 1.30 | 1.83 |
| 500 min | 0.07 | 0.93 | 0.03 | 0.07 | 0.02 | 0.15 | 0.42 | 0.15 | 0.22 | 0.34 | 0.74 |

TABLE 2-continued

| D1 | (A2/A1) − (a/A1) | (A2/A1) − (a/A2) | (D2-d)/D1 | (d-D1)/D2 | (D2-d)/d | (d-D1)//D1 | (D2/D1) − (d/D2) | L1/D2 | L1/D1 | L2/D2 | L2/D1 |
|---|---|---|---|---|---|---|---|---|---|---|---|
| 500 max | 3.28 | 4.37 | 0.98 | 0.27 | 0.85 | 0.39 | 1.62 | 1.93 | 3.21 | 1.30 | 1.83 |
| 600 min | 0.07 | 0.93 | 0.03 | 0.07 | 0.02 | 0.15 | 0.42 | 0.15 | 0.22 | 0.34 | 0.74 |
| 600 max | 3.28 | 4.37 | 0.98 | 0.27 | 0.85 | 0.39 | 1.62 | 1.93 | 3.21 | 1.30 | 1.83 |

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed:

1. Method for registering at least one measured variable of a medium flowing in a process line, by means of a measuring system at least partially inserted into the course of the process line said measuring system including a flow conditioner connected to a supply segment of the process line, as well as a measuring transducer connected to the flow conditioner, said method comprising:
   allowing the medium to be measured to flow out of the supply segment into the flow conditioner;
   inducing at least one essentially stationary toroidal vortex within the medium flowing in an inlet region of the flow conditioner in a manner such that a principal axis of greatest inertia of the at least one toroidal vortex essentially coincides with the longitudinal axis of the flow conditioner, and/or with a longitudinal axis of the measuring tube;
   allowing the medium to be measured to flow out of the flow conditioner into a measuring tube of the connected measuring transducer; as well as
   producing at least one measurement signal, influenced by the measured variable to be registered, by application of at least one sensor element reacting primarily to the measured variable and/or to changes in the measured variable.

2. The method as claimed in claim 1, further comprising:
   inducing at least one further, essentially stationary toroidal vortex in the inlet region of the flow conditioner in such a manner that a principal axis of greatest inertia of each of the at least two toroidal vortices essentially aligns with the other;
   accelerating medium flowing in the flow conditioner in the direction of a longitudinal axis of the flow conditioner;
   allowing medium to flow against an impingement surface of the flow conditioner opposing flowing medium in a boundary region of the flow conditioner for inducing essentially stationary, toroidal vortices in the inlet region of the flow conditioner; and
   allowing medium to flow past a circumferential inner edge protruding into a lumen of the flow conditioner.

3. The method as claimed in claim 2, further comprising:
   allowing medium to flow against an impingement surface of the flow conditioner opposing flowing medium in a boundary region circumferentially closed along a directrix of the flow conditioner for inducing essentially stationary, toroidal vortices in the inlet region of the flow conditioner; wherein the impingement surface of the flow conditioner opposes flowing medium in said boundary region circumferentially closed along the directrix of the flow conditioner.

4. The method as claimed in claim 1, further comprising at least one of the following steps:
   inducing at least one further, essentially locationally fixed toroidal vortex in the inlet region of the flow conditioner in such a manner that a principal axis of greatest inertia of each of the at least two toroidal vortices essentially aligns with the other;
   allowing medium to flow against an impingement surface of the flow conditioner opposing flowing medium in a boundary region circumferentially closed along a directrix of the flow conditioner.

5. The method as claimed in claim 4, further comprising:
   allowing medium to flow past a circumferential inner edge protruding into a lumen of the flow conditioner.

6. The method as claimed in claim 1, further comprising:
   inducing at least one further, essentially stationary toroidal vortex in the inlet region of the flow conditioner in such a manner that a principal axis of greatest inertia of each of the at least two toroidal vortices essentially aligns with the other, wherein said step of inducing the at least further one, essentially stationary, toroidal vortex in the inlet region of the flow conditioner includes steps of allowing medium to flow past a circumferential inner edge protruding into a lumen of the flow conditioner.

7. The method as claimed in claim 1, wherein the inner edge protruding into a lumen of the flow conditioner is circumferentially closed along a directrix of the flow conditioner; and/or
   wherein the at least one further, essentially stationary toroidal vortex is essentially locationally fixed in the inlet region of the flow conditioner.

8. The method as claimed in claim 1, wherein at least one essentially stationary toroidal vortex induced within medium flowing in the inlet region of the flow conditioner is essentially locationally fixed within said inlet region of the flow conditioner; and/or
   wherein the at least one measured variable is selected from a group consisting of a mass flow of said medium, a volume flow of said medium, a flow velocity of said medium, a density of said medium, a viscosity, of said medium, a pressure of said medium, and a temperature of said medium.

9. The method as claimed in claim 1, further comprising:
   partially blocking medium flowing into the flow conditioner for inducing said at least one toroidal vortex.

10. The method as claimed in the claim 9, wherein the step of partially blocking medium flowing into the flow conditioner further includes a step of allowing medium to flow against an impingement surface of the flow conditioner opposing the flowing medium in a border region of the flow conditioner.

11. The method as claimed in claim 9, wherein the step of partially blocking medium flowing into the flow conditioner further includes a step of allowing medium to flow against an impingement surface of the flow conditioner opposing flowing medium in a boundary region circumferentially closed along a directrix of the flow conditioner for inducing essentially stationary, toroidal vortices ,in the inlet region of the flow conditioner; and wherein the impingement surface of the flow conditioner opposes flowing medium in said boundary region circumferentially closed along the directrix of the flow conditioner.

* * * * *